(12) United States Patent
Parkinson

(10) Patent No.: US 8,099,673 B2
(45) Date of Patent: Jan. 17, 2012

(54) USER INTERFACE ANNOTATIONS

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 417 days.

(21) Appl. No.: 11/712,265

(22) Filed: Feb. 26, 2007

(65) Prior Publication Data
US 2008/0209328 A1   Aug. 28, 2008

(51) Int. Cl.
*G06F 3/00* (2006.01)

(52) U.S. Cl. ........... 715/762; 715/709; 714/46; 717/125

(58) Field of Classification Search ................. 715/762, 715/709; 714/46; 717/125
See application file for complete search history.

(56) References Cited

U.S. PATENT DOCUMENTS

| | | | | |
|---|---|---|---|---|
| 5,566,291 A * | 10/1996 | Boulton et al. | | 715/709 |
| 5,806,079 A * | 9/1998 | Rivette et al. | | 715/210 |
| 6,865,713 B1 * | 3/2005 | Bates et al. | | 715/233 |
| 7,529,772 B2 * | 5/2009 | Singh | | 707/104.1 |
| 2003/0056150 A1* | 3/2003 | Dubovsky | | 714/38 |
| 2005/0283736 A1* | 12/2005 | Elie | | 715/771 |
| 2006/0112340 A1* | 5/2006 | Mohr et al. | | 715/733 |

OTHER PUBLICATIONS

Microsoft Press, Microsoft Computer Dictionary, 2002, Fifth Edition, p. 544.*

* cited by examiner

*Primary Examiner* — Dennis Bonshock
(74) *Attorney, Agent, or Firm* — Lowenstein Sandler PC

(57) ABSTRACT

Some embodiments of user interface annotations have been presented. In one embodiment, comments are retrieved from a database coupled to a client machine executing an application program, wherein subjects of the comments comprise at least one of a graphical user interface (GUI) of the application program and one or more user interface (UI) elements in the GUI. Then annotations of the comments are presented on the GUI.

24 Claims, 7 Drawing Sheets

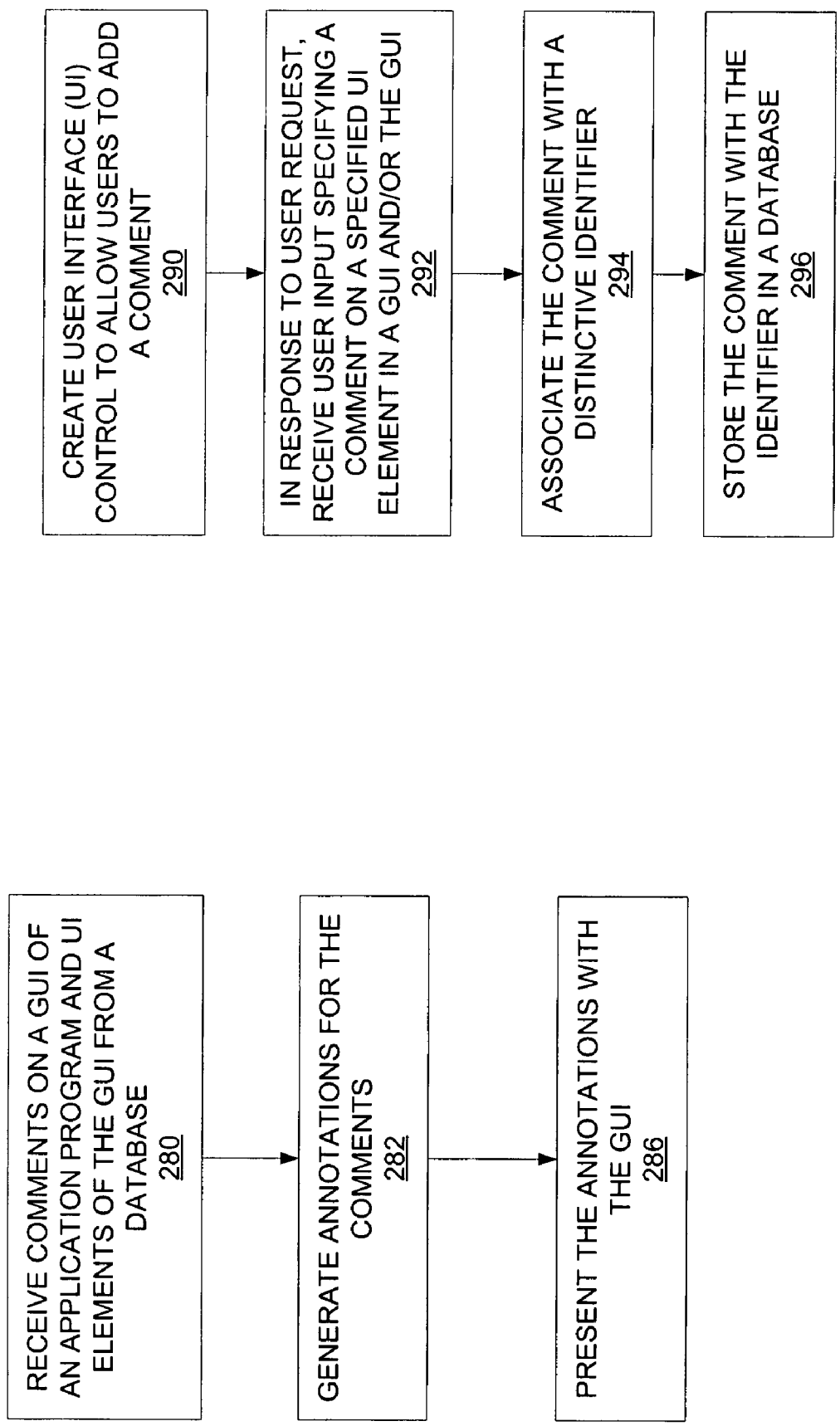

USER INTERFACE ANNOTATIONS

TECHNICAL FIELD

Embodiments of the present invention relate to user interface, and more specifically to annotating a user interface and elements within the user interface.

BACKGROUND

Today, many application programs provide user interface, particularly, graphical user interface (GUI), which typically include a set of user interface elements (e.g., buttons, scroll bars, drop-down list, input fields, etc.). These application programs are hereinafter referred to as the "core applications." Sometimes, users of the core applications may uncover an error in the user interface and/or the user interface elements. Further, the users may desire to make a suggestion on the user interface and/or the user interface elements, such as how to improve a particular user interface element.

Conventionally, the users report the error found or submit the suggestion to a vendor of the core application using a reporting application separate from the core application. For example, the users may send an electronic mail reporting the error found to the vendor. However, the conventional approach suffers from many disadvantages. First, it is typically inconvenient for the users to invoke a separate reporting application to report the error and/or the suggestion, and thus, the users are typically unenthusiastic about reporting errors and/or submitting suggestions. Further, the users may submit duplicate error reports and/or suggestions because one user generally has no knowledge of other users' submissions. As a result, a commonly encountered error in the user interface may be reported multiple times by different users. Valuable program development resources (including labor and time) are wasted in reviewing duplicate error reports and/or suggestions.

DESCRIPTION OF THE DRAWINGS

The present invention is illustrated by way of example, and not by way of limitation, in the figures of the accompanying drawings and in which:

FIG. 2B illustrates a flow diagram of one embodiment of a process to annotate a user interface.

FIG. 2C illustrates a flow diagram of one embodiment of a process to add annotations to a user interface.

DETAILED DESCRIPTION

Figure 1A:
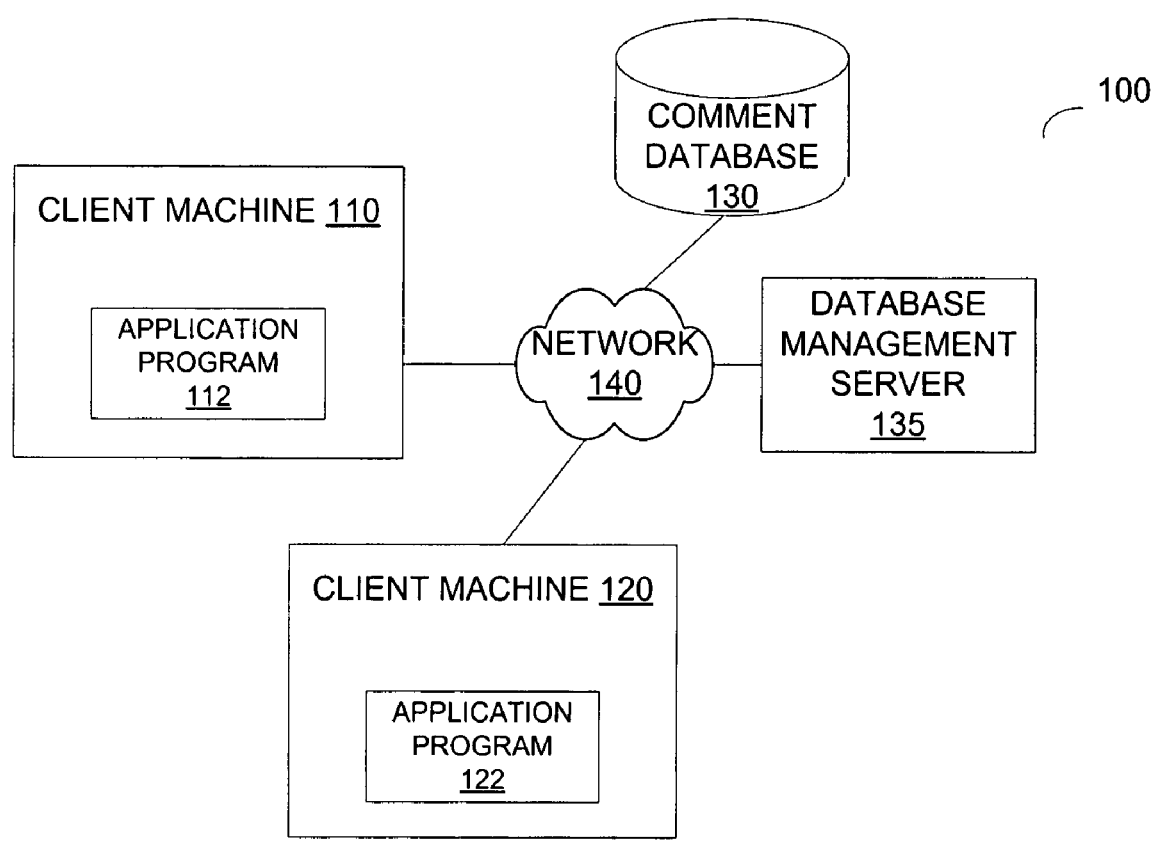
FIG. 1A illustrates an exemplary embodiment of a system in which embodiments of the present invention may be implemented.

Described herein are some embodiments of user interface annotations. In one embodiment, comments are retrieved from a database coupled to a client machine executing an application program. An application program (also simply referred to as an application) generally includes a set of instructions, which, when executed by at least one processing device, causes the processing device to perform one or more tasks. The comments as described herein generally refer to user feedback on a user interface and/or user interface elements, where the feedback may be in the form of text, a selection of one or more values from a predefined list of values, etc. Subjects of the comments may include a graphical user interface (GUI) of the application program (e.g., a browser window) and/or one or more user interface (UI) elements in the GUI (e.g., a "Stop" button in the browser window, a scroll bar in the browser window, etc.). There are many different types of comments, such as reports on errors found in the user interface and/or the user interface elements, suggestions on how to use the user interface and/or the user interface elements, suggestions on how to improve the user interface and/or the user interface elements, etc. After retrieving the comments, annotations of the comments are presented on the GUI.

In some embodiments, an annotation of a comment includes a representation of the comment, which may include one or more graphic and/or textual components (e.g., an icon, a symbol, an alphanumeric character, etc.). Alternatively, the annotation may include the entire comment. In some embodiments, there is one annotation per comment. Alternatively, there is one annotation per type of comments. For example, a first icon may be assigned to represent error reports and a second icon may be assigned to represent suggestions. Further, the first icon may include the number of error reports on a particular user interface element (e.g., a flag with the number of error reports displayed on the flag).

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates an exemplary embodiment of a system 100 in which embodiments of the present invention may be implemented. The system 100 includes multiple client machines (e.g., client machines 110 and 120), a database management server 135, and a comment database 130, which are coupled to each other via a network 140. The network 140 may include one or more of a local area network (LAN), a wide area network (WAN), an intranet, etc. The client machines 110 and 112 may or may not be substantially identical. The client machines 110 and 112 may be implemented on computing devices, such as a desktop personal computer (PC), a laptop PC, a personal digital assistant (PDA), a cellular telephone or mobile telephone, etc. The client machines 110 and 112 are operable to execute application programs. For instance, the client machines 110 and 120 execute application programs 112 and 122, respectively. It should be appreciated that the application programs 112 and 122 may or may not be the same.

Note that any or all of the components and the associated hardware illustrated in FIG. 1A may be used in various embodiments of the system 100. However, it should be appreciated that other configurations of the system 100 may include more or fewer devices than those shown in FIG. 1A.

Each of the application programs 112 and 122 generate a GUI and/or user interface elements. Users of the application programs 112 and 122 may have comments on the GUI and/or the user interface elements. Various user interface controls (e.g., buttons, softkeys, pop-up windows with text fields, etc.) are provided to allow the users to input their comments. For example, to input a comment, a user using the client machine 110 may actuate a user interface control (e.g., by right-clicking a mouse) to invoke a pop-up window having a text field to receive the comment. The user may enter the comment in text into the text field. The comment entered may be stored in the comment database 130.

The comment is stored in the comment database 130 with other comments on the GUI and/or the user interface elements. For example, the user or another user previously used the application 112 on client machine 110 could have added some comments on the GUI and/or the user interface elements. These comments are also stored in the comment database 130. In another example, the applications 112 and 122 are instances of the same application and the user or another user using the application 122 on client machine 120 could have already added some comments on the GUI and/or the user interface elements via the client machine 120. These comments are also stored in the comment database 130.

In some embodiments, the client machines 110 and 120 accesses the comment database 130 directly by sending queries to the comment database 130. Alternatively, the client machines 110 and 120 may access the comment database 130 via the database management server 135. The client machines 110 and 120 may send requests to add comments, to modify comments, to retrieve comments, etc., to the database management server 135. The database management server 135 then composes queries to access the comment database 130 in order to satisfy the requests. In response to a request to retrieve comments, the database management server 135 may return comments retrieved from the comment database 130 to the requesting client machine.

Since the comment database 130 is accessible by multiple client machines (e.g., the client machines 110 and 120), a user on one client machine may access comments from another user, possibly entered using another client machine. In response to user requests, the client machines retrieve comments from the comment database 130 and present the comments on the GUI. For example, a comment on a user interface element may be displayed at or near the user interface element to allow users to easily view and associate the comment with the user interface element.

In some embodiments, annotations of the comments are generated and presented on the GUI. For example, an annotation of a comment on a button in the GUI may be overlaid on the button or presented near the button. As mentioned above, the annotations of the comments include representations of the comments, such as an icon, a symbol, a flag, an alphanumeric character, the entire comment, etc., or any combination of the above. It is convenient for users to view, add, or modify the comments when the annotations of the comments are presented along with the GUI and/or the corresponding user interface elements for many reasons. For instance, the users do not have to go back and forth between a display of the comments and the GUI. Further, the users may readily associate a comment with the associated user interface element because the annotation of the comment is displayed at or near the associated user interface element. Since the users may view all the comments on a user interface element readily, including comments added by other users, the users may avoid entering duplicate comments.

In some embodiments, the comment database 130 stores the comments according to a predefined comment database schema. The comment database schema may be modifiable. In addition to the comments, other information associated with the comments may be stored in the comment database 130, such as a unique identification (ID) of each comment, severity of errors, desirability of incorporating a suggestion, types of errors and/or suggestions, etc. Further, the unique ID of each comment may remain consistent between multiple invocations of the application program from different users, on different client machines, and between different versions of the same applications.

In some embodiments, information about the user interface elements is stored in a resource file during development of the application programs 112 and 122. Each of the user interface elements is typically assigned a unique or distinctive ID so that the application program may distinctively identify the user interface element among a set of user interface elements and may track events generated by the user interface element. Depending on the particular operating system (OS) of the client machine on which an application program is developed, or is executed, this unique ID may be retrieved from the application program's resource file. Alternatively, this unique ID may be retrieved by using application programming interfaces (APIs) to access the OS.

Note that the above annotation mechanism may be part of the application programs 112 and/or 122. Alternatively, the above annotation mechanism may be implemented using an independent annotation program without modifying the source code of the application programs 112 and 122. In some embodiments, the user interface element selected by the user is determined using data exposed by the OS. Such data may include a message from the OS. The annotation program may intercept the message to determine which user interface element the user has selected. Then the independent annotation program displays annotations of comments on the selected user interface element at or near the user interface element. Thus, the source code of the application programs 112 and 122 may not have to be modified in order to provide annotations of comments on the GUI. One embodiment of a functional block diagram of an annotation program is illustrated in FIG. 1B.

By storing comments from different client machines in the comment database 130, a user can access comments from others and thus, may avoid entering duplicate comments. Further, it is sometimes helpful for users to view other users' comments, such as suggestions on how to use the GUI and/or user interface elements. In other words, the users may share their comments on the GUI and/or user interface elements using the above approach. Application developers may also readily access comments on the GUI from different users and/or different client machines, making it convenient for the developer to review the comments. As a result, application development may become more efficient.

Figure 1B:
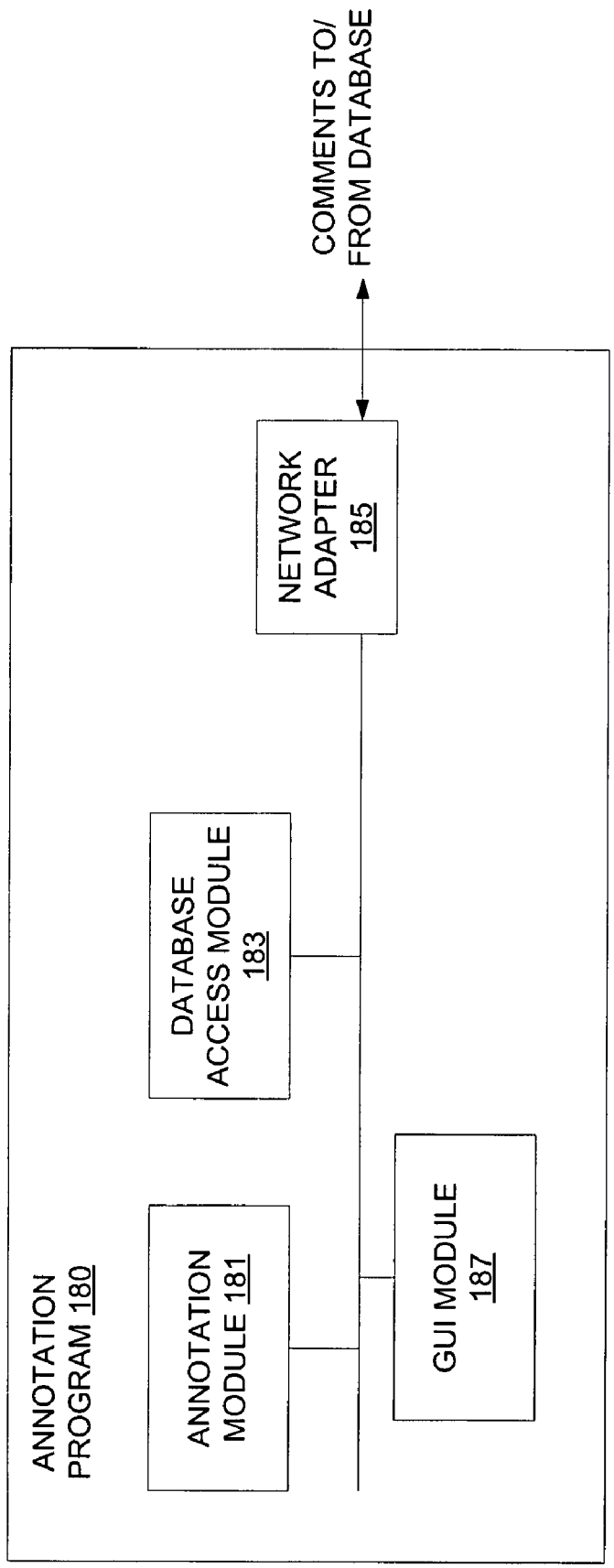
FIG. 1B illustrates one embodiment of an annotation program.

FIG. 1B illustrates a functional block diagram of one embodiment of an annotation program. The annotation program 180 may be executed on a computing device, such as a desktop personal computer (PC), a laptop PC, a personal digital assistant (PDA), a cellular telephone or mobile telephone, etc. The annotation program 180 includes an annotation module 181, a database access module 183, a network adapter 185, and a GUI module 187, which are operatively coupled to each other. The annotation program 180 may be executed on a computing device, such as a desktop personal computer (PC), a laptop PC, a personal digital assistant (PDA), a cellular telephone or mobile telephone, etc.

In some embodiments, an application program (e.g., the application program 112 in FIG. 1A) is being executed on the computing device as well. In the following discussion, the application program is referred to as the "core application." The core application provides a GUI, which may include a set of user interface elements. In some embodiments, the user interface elements in the GUI are implemented as a library loaded into the core application's address space in a storage device of the client machine 180. Further, the user interface changes and the user interface behavior may be implemented using this library.

In some embodiments, the annotation program 180 provides at least two operating modes. A first operating mode is a normal operation mode without annotations on the core application's GUI. A second operating mode is an annotation mode in which annotations of comments are present on the core application's GUI. Users may invoke the annotation mode before and/or during execution of the core application. For instance, a user may start execution of the core application and the core application's GUI is displayed during the normal course of execution. As the user interacts with the core application, the user may desire to make a comment on the core application's GUI and/or the user interface elements of the core application's GUI (e.g., to report an error, to make a suggestion, etc.). The user may request to enter the annotation mode to add a comment. For example, the user may select the user interface element of interest, such as by pointing and clicking a cursor at the user interface element of interest. Then the user may actuate a user interface control (e.g., by right-clicking a mouse) to submit the request to the annotation module 181, which causes the GUI module 187 to create an information-collection dialog tool, such as a dialog box having a text field. The user may enter the comment via the information collection dialog tool. The annotation program 180 receives the comment and sends the comment to a database (e.g., the comment database 130 in FIG. 1A) using the database access module 183 and the network adapter 185.

In some embodiments, the annotation module 181 further includes code to allow the user to view comments on the GUI and/or the user interface elements overlaid on the GUI. In response to a user request to view the comments, the database access module 183 retrieves comments on the GUI and the user interface elements from the database. As discussed above, the comments retrieved may include comments from other users and/or other client machines. The annotation module 181 causes the GUI module 187 to generate annotations of the comments retrieved and to present the annotations on the core application's GUI and/or the user interface elements. For example, drawing events delivered to the core application are intercepted. After the GUI of the core application has been drawn, the annotation module 181 causes the GUI module 187 to draw the annotations (e.g., icons) on top of the core application's GUI. Alternatively, the annotation module 181 may implement a substantially transparent window overlaid on top of the core application's GUI. The GUI module 187 may then draw the annotations in the transparent window such that the annotations are displayed on or near the corresponding user interface elements in the core application's GUI.

In one example, the core application is an Internet browser. The GUI of the Internet browser is a browser window having various user interface elements, including a "Stop" button. Suppose a user finds that the "Stop" button sometimes does not stop a page from loading as expected. The user may request to enter the annotation mode to view comments on the browser and the user interface elements of the browser. In response to the request, the annotation module 181 causes the database access module 183 to retrieve the comments, including all the errors reported on the user interface of the browser. The annotation module 181 then generates annotations for the comments retrieved and causes the GUI module 187 to show the annotations of the comments on the browser window. For instance, a red tag may be displayed on the browser window for each error reported. The user may see some red tags around the "Stop" button, and/or some on other user interface elements of the browser (e.g., the "Reload" button, the scroll bar, etc.). Further, a pop-up window displaying the text of the error report or a summary of the error report may be displayed in response to the user actuating some user interface control (e.g., right-clicking a mouse while the cursor is at a red tag near the "Stop" button).

Facilitating the viewing and entry of comments on the GUI and/or the user interface elements is particularly useful for application program development. Users are more likely to provide feedback on the GUI and/or the user interface elements when it is easy and convenient to do so. User feedback is important in correcting errors and improving the GUI.

Figure 2A:
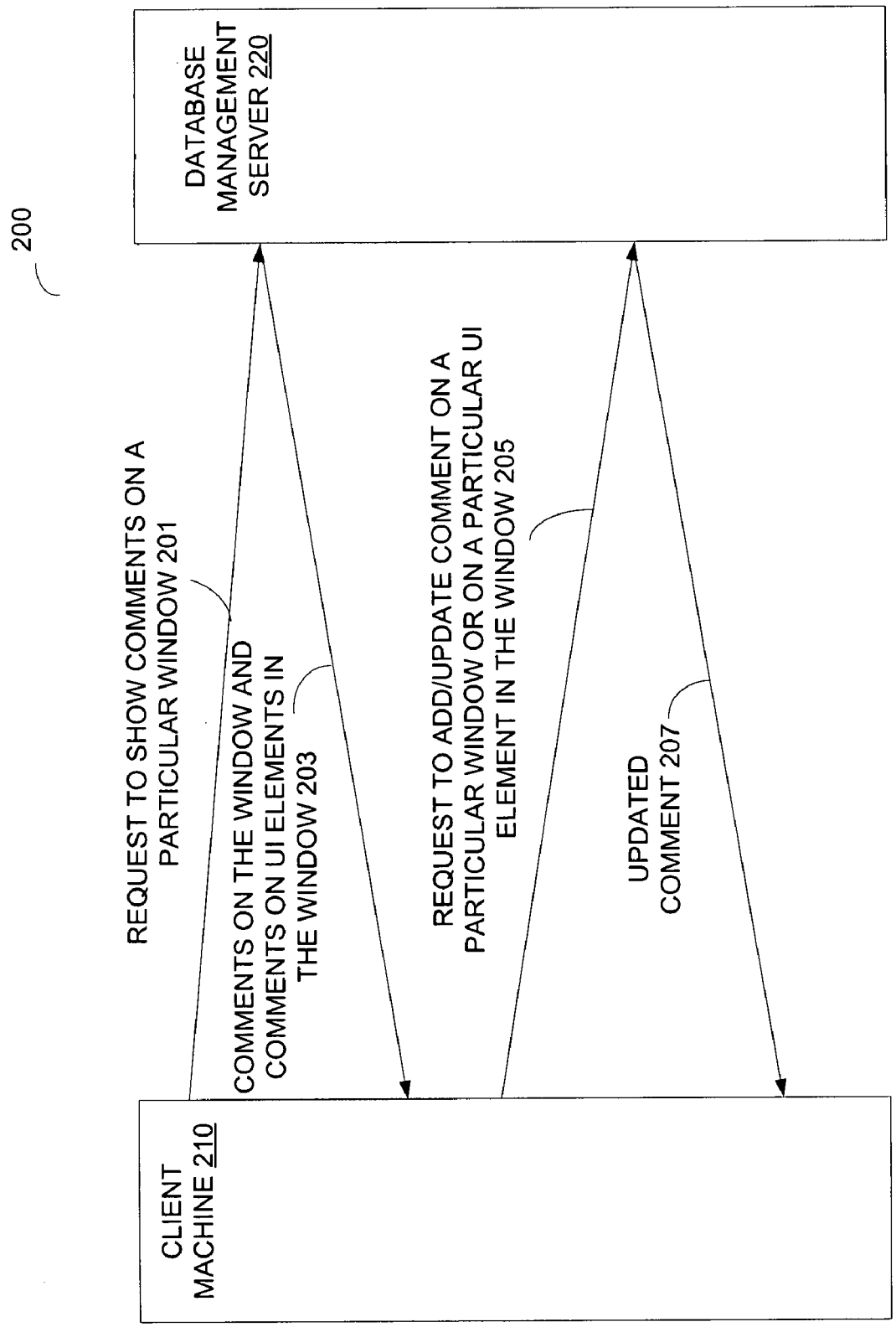
FIG. 2A illustrates a call diagram of one embodiment of a process to annotate a user interface.

FIG. 2A illustrates a call diagram of one embodiment of a process to annotate a user interface. The call diagram 200 illustrates some of the interactions between a client machine 210 (such as the client machine 110 in FIG. 1A) and a database management server 220 (such as the database management server 135 in FIG. 1A) according to some embodiments of the invention.

Referring to FIG. 2A, a request 201 to show comments on a GUI (e.g., a browser window) of an application is sent from a client machine 210 executing the application to a database 220. The request 201 may include one or more database queries (e.g., a query written in Structured Query Language (SQL)) with the unique identifications (IDs) of the GUI and the user interface elements, if any, of the GUI as parameters. In response to the request, the database management server 220 retrieves the comments on the GUI and the user interface elements from a comment database and sends the comments retrieved 203 to the client machine 210. The client machine 210 may present the comments on the GUI, where comments on the user interface elements may be displayed at or near the corresponding user interface elements. Alternatively, the client machine 210 may generate annotations of the comments and present the annotations on the GUI at or near the corresponding user interface elements. Details of some embodiments of the generation and presentation of the annotations have been discussed above.

In response to a user request to add or update a comment on a particular user interface element or the GUI, the client machine 210 sends a request 205 to add or to update the comment to the database 220. The request 205 may include one or more database queries with the unique ID of the user interface elements as a parameter. Based on the request 205, the database management server 220 adds the comment or updates the comment. Then the database management server 220 may send the added or updated comment 207 to the client machine 210. The client machine 210 may present the added or updated comment 207 on the GUI. Alternatively, the client machine 210 may generate an annotation for the comment 207 and present the annotation on the GUI.

FIG. 2B illustrates a flow diagram of one embodiment of a process to annotate a user interface. The process may be performed by processing logic that may comprise hardware (e.g., circuitry, dedicated logic, programmable logic, microcode, etc.), software (such as instructions run on a processing device), firmware, or a combination of any of the above. For example, at least part of the process may be performed by the client machine 110 in FIG. 1A.

Referring to FIG. 2B, processing logic receives comments on a GUI of an application program and user interface elements of the GUI from a database (processing block 280). Processing logic may generate annotations for the comments (processing block 282). For example, processing logic may generate an icon for each comment. Then processing logic presents the annotations on the GUI (processing block 286). For instance, processing logic may display an annotation for a comment on a button of the GUI at or near the button. More details of the generation and presentation of the annotations have been described above.

FIG. 2C illustrates a flow diagram of one embodiment of a process to add annotations to a user interface. The process may be performed by processing logic that may comprise hardware (e.g., circuitry, dedicated logic, programmable logic, microcode, etc.), software (such as instructions run on a processing device), firmware, or a combination of any of the above. For example, at least part of the process may be performed by the client machine 110 in FIG. 1A.

Referring to FIG. 2C, processing logic creates a user interface control to allow users to add a comment on a GUI and/or user interface elements of the GUI (processing block 290). For example, processing logic may create a button displayed on the GUI. A user may actuate the button to request adding a comment. Then the user may move a cursor to a user interface element of interest and right-click a mouse at the user interface element to select the user interface element to comment on. Then processing logic may invoke a user dialog window having a text field to allow the user to enter the comment in the text field.

In response to the user request, processing logic receives user input specifying a comment on the specified user interface element (processing block 292). Processing logic further associates the comment with a distinctive identifier (processing block 294). As such, the comment may be identified with the distinctive identifier (such as a unique number assigned to the comment). Processing logic stores the comment with the identifier in a database (processing block 296). In some embodiments, processing logic sends the comment with the distinctive identifier from a client machine to a database management server, which stores the comment with the distinctive identifier in the database. Alternatively, processing logic composes a database access instruction (such as a query) on a client machine using the distinctive identifier and the comment, and then sends the database access instruction to the database directly from the client machine. The database management server or the client machine may retrieve the comment from the database later using the identifier.

Figure 3A:
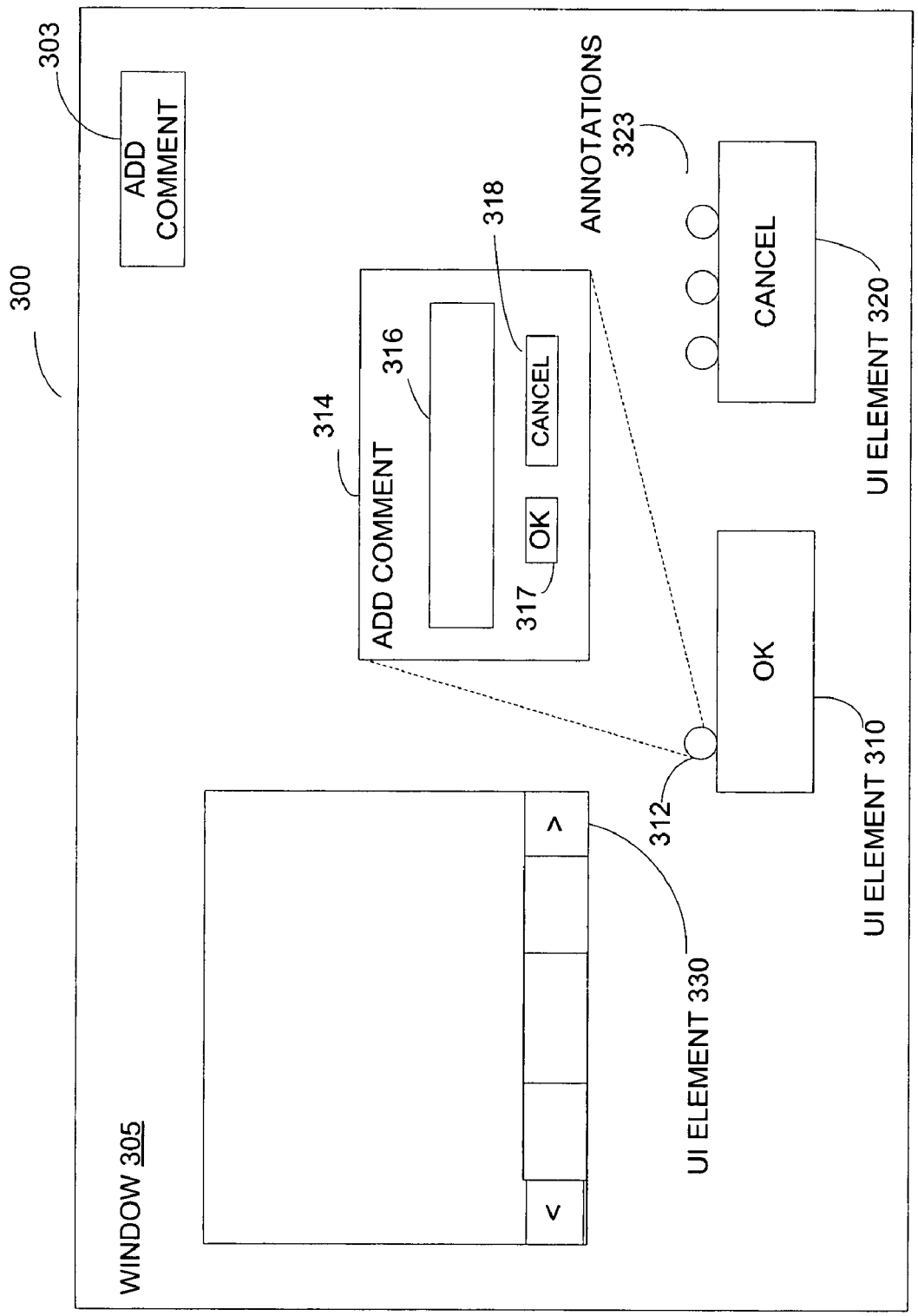
FIGS. 3A-3B illustrate some embodiments of a graphical user interface in which embodiments of the present invention may be implemented.

FIG. 3A illustrates one embodiment of a GUI in which embodiments of the present invention may be implemented. The GUI 300 includes a window 305 and three user interface elements 310, 320, and 330. Annotations of comments are presented on the GUI 300 at or near the corresponding user interface elements. For example, the user interface element 320, a "Cancel" button, has three comments, which are represented by the annotations 323 displayed on top of the "Cancel" button 320. The annotations 323 include three dots, each representing a comment. Each dot indicates a comment has been added on the "Cancel" button. There is no comment on the user interface element 330 and thus, there is no annotation displayed at or near the user interface element 330.

In some embodiments, a user may submit a request to add a comment on the user interface element 310 by activating a user interface control, such as a button 303 integrated in the GUI 300 or overlaid on the GUI 300. In response to the user request, a pop-up dialog window 314 is generated. The pop-up dialog window 314 includes a text field 316 in which the user may type in the comment. When the user is done typing, the user may actuate the "OK" button 317 in the pop-up dialog window 314 to add the comment. If the user wants to cancel the adding of the comment, the user may actuate the "Cancel" button 318 in the pop-up dialog window 314. After the user has added the comment, the annotation 312 for the comment may be displayed on top of the user interface element 310.

Figure 3B:
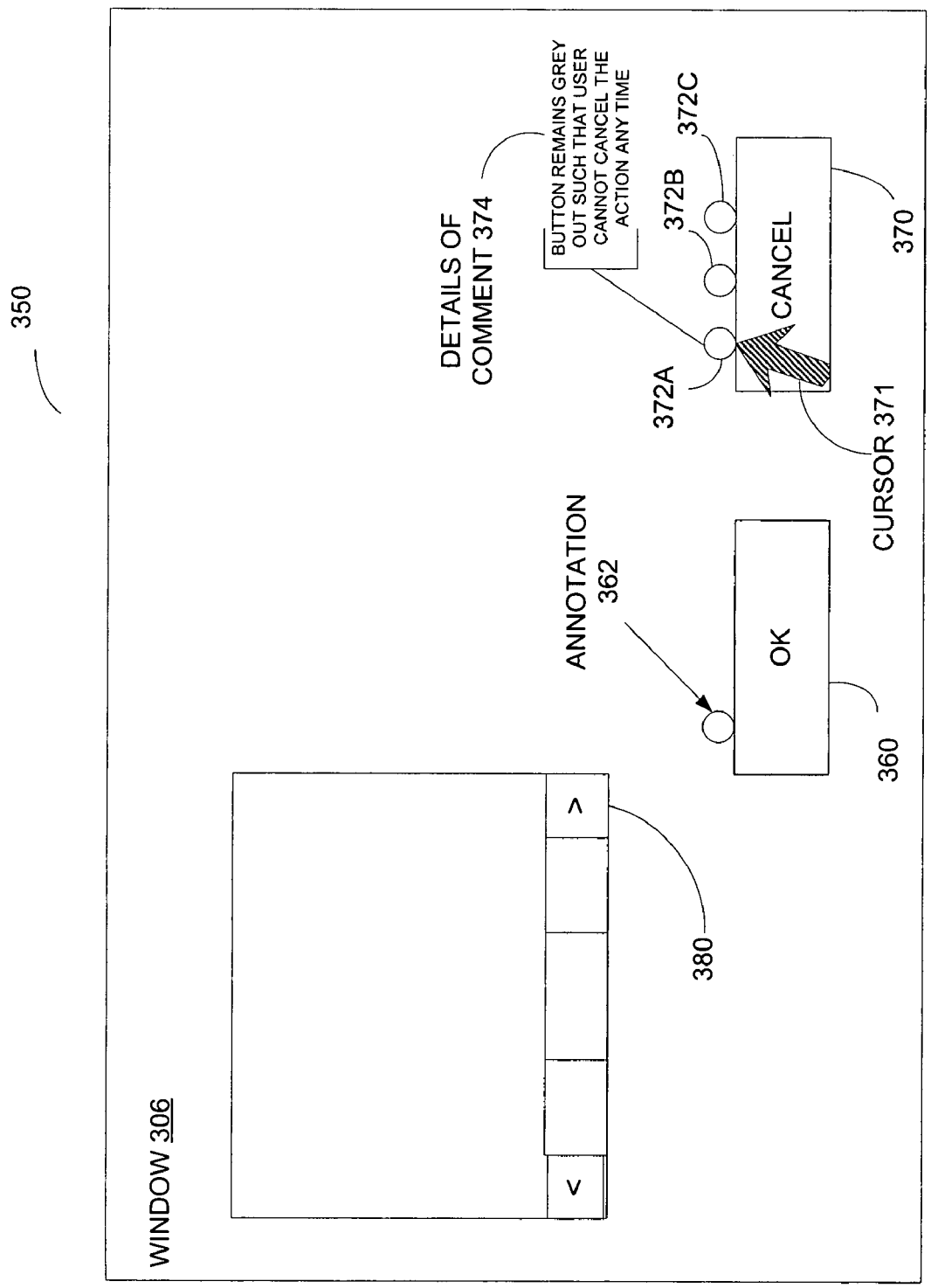

FIG. 3B illustrates another embodiment of a GUI in which embodiments of the present invention may be implemented. The GUI 350 includes a window 306 and three user interface elements 360, 370, and 380. There is one comment on the user interface element 360 and thus, an annotation 362 for the comment is displayed on top of the user interface element 360. There is no comment on the user interface element 380 and thus, there is no annotations displayed at the user interface element 360. There are three comments on the user interface element 370, and thus, there are three annotations 372A-372C for the comments displayed on top of the user interface element 370. Each of the annotations 372A-372C corresponds to a distinct one of the three comments.

In some embodiments, a user may view the details of a comment using some user interface control. For example, the user may move a cursor to the annotation corresponding to a comment of interest to cause the details of the comment of interest to be displayed on the GUI 350. For example, referring to FIG. 3B, a cursor 371 is moved to the annotation 372A to cause the details 374 of the corresponding comment to be displayed on the GUI 350.

Figure 4:
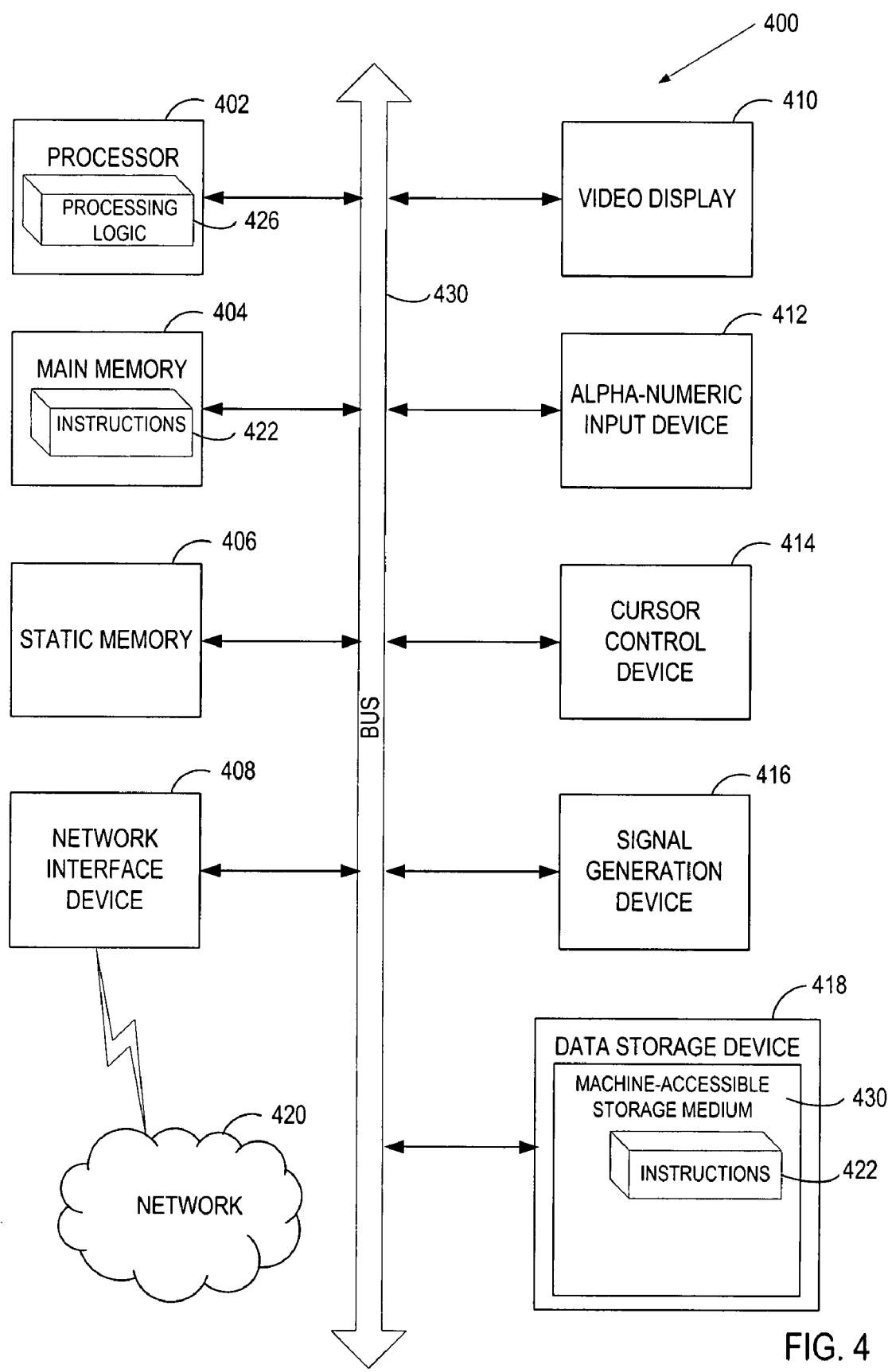
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 518 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of user interface annotations have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by an annotation program running on a client machine executing an application program, a request from a user to enter an annotation mode for presenting a graphical user interface (GUI) of the application program, wherein the GUI is running in a normal operating mode that excludes presenting any annotations in the GUI;
invoking, by a GUI module of the annotation program, the annotation mode for presenting the GUI by creating an information collection tool overlaid on the GUI to receive one or more comments from the user regarding a functional capability of at least one user interface (UI) elements in the GUI;
retrieving, by a database accessing module of the annotation program, comments from a database coupled to the client machine, wherein the comments are contributed by a plurality of other users and subjects of the comments relate to the functional capability of the at least one user UI element in the GUI, and wherein the comments in the database are accessible for review for purposes of application development of the application program;
presenting, by the GUI module, one or more annotations corresponding to a UI element in the GUI at a location that associates each annotation with the corresponding UI element, wherein each annotation is a graphical representation indicative of an existence of a comment relating to the corresponding UI element;
detecting a selection of one of the annotations corresponding to a comment relating to a UI element; and
displaying details of the comment at the UI element in response to detecting the selection of the annotation, wherein the GUI can further receive user input to generate a comment corresponding to a UI element.

2. The method of claim 1, further comprises:
receiving user input to return the GUI to the normal operating mode; and presenting the GUI in the normal operating mode by removing the information collections dialog box and the presentation of the one or more annotations corresponding to the UI elements in the GUI.

3. The method of claim 1, further comprising:
detecting a selection of a UI element in the GUI, the selected UI element being a subject of a comment to be generated;
receiving user input via the information collection tool to generate the comment corresponding to the selected UI element and generating the comment; and
storing, by the database accessing module, the comment in the database, wherein the database is accessible by other client machines.

4. The method of claim 1, further comprising:
generating, by the GUI module, a user interface control to allow users to edit the comments; and
updating, by an annotation module running on the client machine, the comments in the database in response to edits made by the users.

5. The method of claim 1, further comprising:
receiving, by the computing device via the GUI, a user request specifying one of the annotations, wherein the annotation is a graphical representation indicative of an existence of a comment relating to the GUI; and
displaying, by the GUI module, on the GUI the comment corresponding to the specified one of the annotations.

6. The method of claim 1, wherein the comments comprise an error report on at least one of the GUI and the one or more UI elements.

7. The method of claim 1, wherein:
the comments include a suggestion on how to improve at least one of the GUI and the one or more UI elements; and
the annotations comprise a graphical representation indicative of a suggestion on an improvement to the at least one of the GUI and the one or more UI elements.

8. The method of claim 1, wherein:
the comments include a suggestion on how to use at least one of the GUI and the one or more UI elements; and
the annotations comprise a graphical representation indicative of a suggestion on a usage of the at least one of the GUI and the one or more UI elements.

9. The method of claim 1, further comprising:
associating, by an annotation module running on the client machine, each of the one or more UI elements in the GUI with a distinctive identifier, wherein retrieving comments from the database comprises querying the database using the distinctive identifier and an identifier of the GUI.

10. An apparatus comprising:
a memory;
a processing device communicably coupled to the memory;
an application program executed by the processing device from the memory; and
an annotation program executed by the processing device from the memory, the annotation program configured to:
receive a request from a user to enter an annotation mode for presenting a graphical user interface (GUI) of the application program wherein the GUI is running in a normal operating mode that excludes presenting any annotations in the GUI;
invoke the annotation mode for presenting the GUI by creating an information collection tool overlaid on the GUI to receive one or more comments from the user regarding a functional capability of at least one user interface (UI) elements in the GUI;
retrieve comments from a database coupled to the client machine, wherein the comments are contributed by a plurality of other users and subjects of the comments relate to the functional capability of the at least one UI element in the GUI, and wherein the comments in the database are accessible for review for purposes of application development of the application program;
present one or more annotations corresponding to a UI element in the GUI at a location that associates each annotation with the corresponding UI element, wherein each annotation is a graphical representation indicative of an existence of a comment relating to the corresponding UI element,
detect a selection of one of the annotations corresponding to a comment relating to a UI element; and
display details of the comment at the UI element in response to detecting the selection of the annotation, wherein the GUI can further receive user input to generate a comment corresponding to a UI element.

11. The apparatus of claim 10, further comprising:
a network adapter, running on the computing device and coupled to a database accessing module of the annotation program, the network adapter to communicatively couple the database accessing module to a network to access the database.

12. The apparatus of claim 10, further comprising:
an application processing module, running on the computing device, coupled to a GUI module of the annotation program, the application processing module to execute the application program.

13. The apparatus of claim 10, wherein the annotation program further comprises an annotation module to associate each comment with a distinctive identifier, wherein the comment is stored in the database with the distinctive identifier.

14. The apparatus of claim 10, wherein the GUI module is further configured to:
receive user input to return the GUI to the normal operating mode; and
present the GUI in the normal operating mode by removing the information collections dialog box and the presentation of the one or more annotations corresponding to the UI elements in the GUI.

15. A system comprising the apparatus of claim 10, further comprising the database.

16. A non-transitory machine-readable storage medium that provides instructions that, when executed by a processor, will cause the processor to perform operations comprising:
receiving a request from a user for an application program executed on a client machine to enter an annotation mode for presenting a graphical user interface (GUI) of the application program, wherein the GUI is running in a normal operating mode that excludes presenting any annotations in the GUI;
invoking the annotation mode for presenting the GUI by creating an information collection tool overlaid on the GUI to receive one or more comments from the user regarding a functional capability of at least one user interface (UI) elements in the GUI;
retrieving comments from a database coupled to the client machine, wherein the comments are contributed by a plurality of other users and subjects of the comments relate to the functional capability of the at least one UI element in the GUI, and wherein the comments in the database are accessible for review for purposes of application development of the application program;

presenting one or more annotations corresponding to a UI element in the GUI at a location that associates each annotation with the corresponding UI element, wherein each annotation is a graphical representation indicative of an existence of a comment relating to the corresponding UI element;

detecting a selection of one of the annotations corresponding to a comment relating to a UI element; and displaying details of the comment at the UI element in response to detecting the selection of the annotation, wherein the GUI can further receive user input to generate a comment corresponding to a UI element.

17. The machine-readable storage medium of claim 16, wherein further comprising:

receiving user input to return the GUI to the normal operating mode; and presenting the GUI in the normal operating mode by removing the information collections dialog box and the presentation of the one or more annotations corresponding to the UI elements in the GUI.

18. The machine-readable storage medium of claim 16, wherein the operations further comprise:

detecting a selection of a UI element in the GUI, the selected UI element being a subject of a comment to be generated;

receiving user input via the information collection tool to generate the comment corresponding to the selected UI element and generating the comment; and storing, by the database accessing module, the comment in the database, wherein the database is accessible by other client machines.

19. The machine-readable storage medium of claim 16, wherein the operations further comprise:

generating a user interface control to allow users to edit the comments; and updating the comments in the database in response to edits made by the users.

20. The machine-readable storage medium of claim 16, wherein the operations further comprise:

receiving a user request specifying one of the annotations, wherein the annotation is a graphical representation indicative of an existence of a comment relating to the GUI; and displaying on the GUI the comment corresponding to the specified one of the annotations.

21. The machine-readable storage medium of claim 16, wherein the comments comprise an error report on at least one of the GUI and the one or more UI elements.

22. The machine-readable storage medium of claim 16, wherein:

the comments include a suggestion on how to improve at least one of the GUI and the one or more UI elements; and the annotations comprise a graphical representation indicative of a suggestion on an improvement to the at least one of the GUI and the one or more UI elements.

23. The machine-readable storage medium of claim 16, wherein:

the comments include a suggestion on how to use at least one of the GUI and the one or more UI elements; and the annotations comprise a graphical representation indicative of a suggestion on a usage of the at least one of the GUI and the one or more UI elements.

24. The machine-readable storage medium of claim 16, wherein the operations further comprise:

associating each of the one or more UI elements in the GUI with a distinctive identifier, wherein retrieving comments from the database comprises querying the database using the distinctive identifier and an identifier of the GUI.

* * * * *